United States Patent
Bakkeren et al.

(10) Patent No.: US 6,476,183 B2
(45) Date of Patent: Nov. 5, 2002

(54) COATING COMPOSITION COMPRISING AN OXIDATIVELY DRYING POLYUNSATURATED CONDENSATION PRODUCT, A POLYTHIOL, AND A SICCATIVE

(75) Inventors: Frank Johannes A. D. Bakkeren, Sassenheim (NL); Robert Paul Klaasen, Amsterdam (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/742,915

(22) Filed: Dec. 21, 2000

(65) Prior Publication Data

US 2001/0008932 A1 Jul. 19, 2001

(30) Foreign Application Priority Data

Dec. 22, 1999 (EP) .............................. 99204467

(51) Int. Cl.$^7$ ............................... C08G 75/04
(52) U.S. Cl. ................ 528/376; 528/364; 525/350; 524/599; 524/609; 524/845; 524/846; 428/419
(58) Field of Search ................ 528/376, 364; 525/350; 524/599, 609, 845, 846; 428/419

(56) References Cited

U.S. PATENT DOCUMENTS

| 3,662,023 A | 5/1972 | Kehr et al. | 260/858 |
| 3,697,397 A | 10/1972 | Kehr et al. | 204/159.14 |
| 4,571,420 A | 2/1986 | Marks | 525/350 |
| 4,698,385 A | 10/1987 | Schindler | 524/733 |

FOREIGN PATENT DOCUMENTS

| DE | 1 694 553 | 2/1972 | C08F/29/40 |
| EP | 0 156 493 | 10/1985 | C09D/3/80 |
| JP | A-2075669 | 3/1990 | C09D/5/00 |

OTHER PUBLICATIONS

Kawamura Yuzuru, *Abstracts of Japan,* 02075669, dated Mar. 15, 1990.
*Derwent Abstract,* 1990–127862, Japanese Patent No. JP02075669.

*Primary Examiner*—Duc Truong
(74) *Attorney, Agent, or Firm*—Joan M. McGillycuddy

(57) ABSTRACT

Coating composition and its use in a one-pot system. The coating composition comprises:
an oxidatively drying polyunsaturated condensation product, such as an alkyd, having pendant groups in an amount of more than 20% by weight of the condensation product, the pendant groups comprising unsaturated CC bonds;
a polythiol having two or more SH-groups;
a siccative.

The equivalence ratio of thiol functional groups to unsaturated CC bonds being less than 0.3, preferably between 0.01 and 0.25. The coating composition comprises 1–30 wt-%, preferably 3–20 wt-%, of thiol compounds, related to the total weight of solid resin. The coating composition further comprises a drying accelerating complexing agent, preferably 2,2'-bipyridyl or 1,10-phenantroline.

13 Claims, No Drawings

COATING COMPOSITION COMPRISING AN OXIDATIVELY DRYING POLYUNSATURATED CONDENSATION PRODUCT, A POLYTHIOL, AND A SICCATIVE

This application claims priority of European Patent Application No. 99204467.7, filed on Dec. 22, 1999.

The present invention relates to a coating composition comprising a polyunsaturated polymer, a polythiol, and a siccative.

BACKGROUND OF THE INVENTION

U.S. Pat. No. 4,571,420 discloses a composition comprising a polythiol, a polyene, and a vanadium compound used as a siccative. This composition is an acrylate based coating composition designed to remain flexible after curing and is suitable for use as, e.g., roof mastics. Pendant unsaturation is low, which leads to limited cross-linking. The equivalence ratio of thiol-functional groups to olefinically unsaturated groups in this known composition is high, so the thiol induced drying mechanism is dominant and there is no oxidative drying. Another acrylate based coating composition comprising acrylic polyenes, thiols, and a vanadium based siccative is known from U.S. Pat. No. 4,698,385. A drawback to such acrylic based coating compositions is their instability. When mixed, the components react instantaneously. The reaction is exothermal and releases a lot of thermal energy. The pot life is limited.

In order to prevent problems with, e.g., toxicity, tackiness, and viscostability and for economic reasons, in many cases alkyd based coating compositions are preferable. However, these alkyd based coating compositions are slow drying in comparison with acrylate based coating compositions.

Japanese patent application JP-A 2075669 discloses such an alkyd based coating composition comprising a metal drier and, optionally, a thio-functional silane coupling agent. The thio-functional coupling agent is a mono-thiol which is added to enhance the adhesive properties. Since the coupling agent is a mono-thiol, it cannot serve as a cross-linker.

SUMMARY OF THE INVENTION

The object of the invention is to provide a stable alkyd based coating composition showing fast curing at low temperatures on the one hand and a sufficiently long shelf life, especially for one-pot systems, on the other.

The object of the invention is achieved by means of a coating composition according to the opening paragraph, comprising:

a. an oxidatively drying polyunsaturated condensation product having pendant groups in an amount of more than 20% by weight of the condensation product, the pendant groups comprising unsaturated CC bonds;

b. a polythiol having two or more SH-groups;

c. a siccative;

the equivalence ratio of thiol-functional groups to unsaturated CC bonds being less than 0.3.

DETAILED DESCRIPTION OF THE INVENTION

It has surprisingly been found that the addition of thiol compounds to oxidatively drying polyunsaturated condensation products in the presence of siccatives leads to better curing at low temperatures in comparison with the usual alkyd coating compositions. Though the composition according to the invention shows fast curing, a good shelf life is obtained, even in one-pot systems.

Suitable oxidatively drying polyunsaturated condensation products are alkyd resins. At least a part of the alkyd resin is oxidatively drying as a result of the incorporation of a large number of unsaturated, aliphatic compounds, at least a portion of which is polyunsaturated. The unsaturated aliphatic compounds preferably are unsaturated fatty acids, more particularly polyunsaturated fatty acids. Examples of fatty acids comprising one equivalent of unsaturated CC bonds are myristoleic acid, palmitoleic acid, oleic acid, gadoleic acid, erucic acid, and ricinoleic acid and mixtures thereof. Examples of fatty acids comprising two or more equivalents of unsaturated CC bonds include linoleic fatty acid, linolenic fatty acid, elaeostearic fatty acid, licanic fatty acid, arachidonic fatty acid, clupoanodonic fatty acid, nisinic fatty acid, and mixtures thereof. Fatty acids containing conjugated double bonds, such as dehydrated castor oil fatty acid, wood oil fatty acid and/or calendula oil fatty acid can be used as well. Fatty acids derived from soya oil are especially suitable.

Examples of suitable divalent polyol compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol. Preferably, use is made of compounds having 3–12 carbon atoms, e.g., glycerol, pentaerythritol and/or dipentaerythritol.

Alternatively or additionally, polycarboxylic acids can be used as building blocks for the oxidatively drying polyunsaturated condensation products. Examples of suitable polycarboxylic acids include phthalic acid, citric acid, fumaric acid, mesaconic acid, maleic acid, citraconic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerised fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetracarboxylic acid, endoisopropylidene-cyclohexane-1,2-dicarboxylic acid, cyclohexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1–4 carbon atoms.

Optionally, the oxidatively drying polyunsaturated condensation product may comprise other building blocks, which may for example be derived from monocarboxylic acids such as pivalic acid, 2-ethylhexanoic acid, lauric acid, palmitic acid, stearic acid, 4-tert.butyl-benzoic acid, cyclopentane carboxylic acid, naphthenic acid, cyclohexane carboxylic acid, 2,4-dimethyl benzoic acid, 2-methyl benzoic acid, benzoic acid, 2,2-dimethylol propionic acid, tetrahydrobenzoic acid, and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed.

Optionally, isocyanates can also be used as building blocks for the oxidatively drying polyunsaturated condensation product. Suitable isocyanates are for example diisocyanates, such as 1,6-hexane diisocyanate, isophorone diisocyanate, toluene diisocyanate, diphenyl diisocyanate, and dicyclohexylmethane diisocyanate. Triisocyanates can also be used.

The unsaturated groups in the oxidatively drying polyunsaturated condensation product are preferably introduced by the fatty acids, but may, alternatively or additionally, be introduced by one or more of the polyols, carboxylic acids or anhydrides or other building blocks used, such as fatty mono-alcohols.

The oxidatively drying polyunsaturated condensation product has pendant groups in an amount of more than 20%, preferably more than 50%, by weight of the condensation product. An amount of more than 65% is even more preferred.

A specific example of a suitable alkyd is the condensation product of soya oil, phthalic anhydride, and pentaerythritol.

The alkyd resins can be obtained by direct esterification of the constituent components, with the option of a portion of these components having been converted already into ester diols or polyester diols. Alternatively, the unsaturated fatty acids can be added in the form of a drying oil, such as sunflower oil, linseed oil, tuna fish oil, dehydrated castor oil, coconut oil, and dehydrated coconut oil. Transesterification with the polyols and, optionally, other building blocks will then give the final alkyd resin. This transesterification generally takes place at a temperature in the range of 115 to 250° C., optionally with solvents such as toluene and/or xylene also present. The reaction generally is carried out in the presence of a catalytic amount of a transesterification catalyst. Examples of transesterification catalysts suitable for use include acids such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride.

Preferably, the coating composition comprises 70–99 wt-%, more preferably 80–97 wt-%, of oxidatively drying polyunsaturated condensation products, related to the total weight of solid resin. The molecular weight of the oxidatively drying polyunsaturated condensation products may for instance be between 150–80 000, preferably between 500–20 000.

Examples of suitable thiol compounds include, but are not limited to, the esters of thioglycolic acid, 2-mercaptopropionic acid or 3-mercaptopropionic acid with polyols, such as glycols, pentaerythritol, di-pentaerythritol and trimethylolpropane, and optionally a fatty acid, such as oleic acid, stearic acid, isononanoic acid or sunflower fatty acid. Specific examples of suitable thiol compounds are ethylene glycol bis (thioglycolate), ethylene glycol bis (2-mercaptopropionate), ethylene glycol bis (3-mercaptopropionate), pentaerythritol tetrakis (thioglycolate), pentaerythritol tetrakis (2-mercaptopropionate), pentaerythritol tetrakis (3-mercaptopropionate), trimethylolpropane tris(2-mercaptopropionate), trimethylolpropane tris(3-mercaptopropionate), and the condensation product of di-trimethylolpropane, 2,2-dimethylolpropionic acid, stearic acid, and 3-mercaptopropionic acid.

Preferably, the coating composition comprises 1–30 wt-% of thiol compounds, related to the total weight of solid resin, more preferably 3–20 wt-% of thiol compounds. The thiols may for example have a molecular weight of 50–20 000.

Alternatively, the oxidatively drying polyunsaturated condensation product and the thiol compound can be embodied in the same copolymer, if so desired.

The ratio between the number of SH-functional groups and unsaturated CC bonds is below 0.3 and preferably between 0,01 and 0,25, more preferably between 0.05 and 0.15.

Examples of suitable siccatives are metal salts of aliphatic acids, including cycloaliphatic acids, or aromatic acids, such as ethylhexanoic acid, octanoic acid, and naphthenic acid, where the metal is, for example, cobalt, manganese, lead, vanadium, iron, zirconium, calcium, copper, potassium, lithium, zinc, aluminum, magnesium, bismuth, or a rare earth metal. Alternatively, the siccative may be selected from metal oxide acetylacetonates, metal acetylacetonates, metal chlorides, metal sulphates, and metal alcoholates, where the metal is, for example, selected from the above-mentioned metals. Typically, mixtures of siccatives are used. The siccatives (calculated as metal) are usually applied in an amount of 0.001 to 3 wt-%, calculated on the total binder solids content. Vanadium compounds and manganese compounds are preferred.

The composition according to the invention can be used as a clear varnish or may contain pigments. Examples of pigments suitable for use are metal oxides, such as titanium dioxide or iron oxide, or other inorganic or organic pigments.

The coating composition may furthermore contain one or more additives such as UV stabilisers, cosolvents, dispersants, surfactants, inhibitors, fillers, anti-static agents, flame-retardant agents, lubricants, anti-foaming agents, extenders, plasticisers, anti-freezing agents, waxes, thickeners, thixotropic agents, etc. Furthermore, the coating composition according to the invention may optionally comprise various anti-oxidants and anti-skinning agents known in the art of the formulation of coating compositions, for example:

phenol derivatives, e.g. pyrogallol, 2,6-di-tert.butylhydroxytoluene, hydroquinone, octadecyl-3-(3,5-di-tert.butyl-4-hydroxyphenyl)propionate—Irganox® 1076 (available from Ciba SC), bis(2-mercapto-ethyl)-(3-(3,5-di-tert.butyl-4-hydroxyphenyl)propionate) sulphide—Irganox® 1035 (available from Ciba SC), monomethyl ether of hydroquinone, propenyl phenol, 4-acetoxystyrene, isoeugenol, lauryl gallate;

sulphides, e.g. phenothiazine, dodecylsulphide, di(dodecyl)thiodipropionate; phosphines, e.g. trimethylphosphine, tri-n.octylphosphine, triphenylphosphine;

phosphites, e.g. trimethylphosphite, triphenylphosphite, tris(nonylphenyl)phosphite, ethyl-bis(2,4-di-tert.butyl-6-methylphenyl)phosphite—Irgafos® 38 (available from Ciba SC), tris(2,4-di-tert.butylphenyl) phosphite—Irgafos® 168 (available from Ciba SC), bis(2,4-di-tert.butylphenyl)pentadiphosphite—Ultranox® 626 (available from General Electric);

phosphonites, e.g. tetrakis(2,4-di-tert.butylphenyl)(1,1-biphenyl)-4,4'-diylbisphosphonite—Irgafos® P-EPQ (available from Ciba SC); dioxo-compounds, e.g. 2,4-pentanedione, dibenzoylmethane, 2,4-hexanedione, 1,3-cyclohexanedione, oxopropionic acid, 2-methyl-3-oxosuccinic acid diethyl ester, oxalacetic acid; oximes, e.g. butanone oxime, butyraldehyde oxime, cyclohexanone oxime; hydroxyacetone, diethylhydroxylamine, 3,5-dimethylpyrazole, ascorbic acid, Hindered Amine Light Stabilisers (HALS), e.g. Tinuvin® 123 and Tinuvine® 292 (available from Ciba SC), 2,3-butenediol, dibenzoyloxybutene, dibenzylthiocarbamic acid zinc salt, Vitamin E, Vitamin E acetate, hypophosphorous acid, 2-butylbenzofuran, 3,4-dihydro-2-ethoxy-2H-pyran, dodecylmercaptane, dicyclopentadiene.

Coating compositions according to the invention may optionally comprise various drying-accelerating, complexing agents known in the art of the formulation of coating compositions, for example, 2,2'-bipyridyl and 1,10-phenantroline. Preferably, the complexing agents are added in an amount of 0–3 wt-%, preferably 0.1–1.5 wt-%, based on the weight of the total binder.

The coating composition according to the present invention can be used as a high solids coating composition, comprising 0–40 wt-%, preferably 0–30 wt-%, solvents. However, it is also suitable for conventional coating compositions with a higher solvents content. Alternatively, the composition can be used as an aqueous coating composition.

The coating composition according to the present invention can be applied by conventional methods, including brushing, roll coating, spray coating, or dipping.

The composition may be stored as a one-component coating composition. Alternatively, the coating composition may be stored as two or more components, which are mixed before use.

The coating composition according to the invention is especially suitable for use as a decorative or do-it-yourself coating, e.g. for wood substrates, such as door or window frames, but can also be used in industry, in particular for wooden substrates. The coating composition may also be used for substrates made of metal, concrete, plastics or other materials.

The invention is further described and illustrated by the following examples. In these examples the compositions listed below are present as indicated.

| | |
|---|---|
| Mn 12 Cem-All ® LC | Siccative comprising 12 wt-% manganese, commercially available from OMG; |
| Cur-RX ® | Siccative comprising 4 wt-% vanadium, commercially available from OMG; |
| Dri-RX ® 19 LC-E | curing accelerator, comprising 19 wt-% of 2,2'-bipyridyl, commercially available from OMG; |
| Zr 18 Hex-Cem ® | Siccative comprising 18 wt-% zirconium, commercially available from OMG; |
| Nuodex Combi APB ® | siccative composition comprising 7,5 wt-% metal drier (cobalt, zirconium and calcium), commercially available from Servo Delden BV, Delden, the Netherlands; |
| Setal ® 270 | a conventional alkyd resin based on soybean oil, pentaerythritol, and phthalic anhydride, having a solids content of about 70% in white spirit and having unsaturated pendant groups in an amount of about 59% by weight of the condensation product. Setal ® 270 is commercially available from Akzo Nobel Resins, Bergen op Zoom, the Netherlands; |
| Setal ® 293 | a solvent-free alkyd resin, based on pentaerythritol and unsaturated fatty acids derived from sunflower oil and having unsaturated pendant groups in an amount of about 76% by weight of the condensation product. Setal ® 293 is commercially available from Akzo Nobel Resins, Bergen op Zoom, the Netherlands; |
| Shellsol ® D40 | solvent, commercially available from Shell; |
| Synolac ® 6094 | a high solids alkyd resin, based on linoleic fatty acid, having a solids content of about 88% in isoparaffinic solvent and having unsaturated pendant groups in an amount of about 70% by weight of the condensation product. Synolac ® 6094 is commercially available from Cray Valley Ltd, United Kingdom. |

In the examples, the following abbreviations are used:

| | |
|---|---|
| PT3MP | pentaerythritol tetrakis (3-mercapto propionate), a thiol compound commercially available from Aldrich; |
| PVC | pigment volume concentration. |

In the following, weight percentages are based upon the total weight of the solids content of the binder, consisting of the polycondensation products and the thiol compounds present in the composition concerned. Where amounts are given in parts by weight (pbw), the amount of total binder (thiol compound plus polyunsaturated condensation product) is set at 100 parts by weight.

The drying time was measured as follows. The coating composition was applied on a glass plate with a draw bar. Curing took place at 10° C. and 80% relative humidity in a climatised room under TL-055 light. Drying was tested by means of a BK Drying Recorder. The results obtained in this fashion can be classified as follows:

Phase 1: the line traced by the pin closes up again ("open time").

Phase 2: the pin traces a scratchy line ("dust free").

Phase 3: the pin traces a straight line in the paint which does not close up again ("tack-free time").

Reaction Product A—Thiol Compound

A thiol compound was made in the following way:

118.6 g of di(trimethylolpropane) and 508,2 g of 2,2-dimethylolpropionic acid were charged to a reaction flask equipped with a stirrer, a nitrogen inlet, a thermo couple, a Vigreux® cooler, and a Dean-Stark® apparatus. The mixture was esterified at 140° C. using 14.4 g of para-toluene sulphonic acid as a catalyst. When water distillation ceased, a vacuum was applied to remove water. After reaching an acid value below 10, 698,4 g stearic acid were added, while the temperature of the mixture was kept above 110° C. Then 5 wt-% of xylene was added and 289 g of 3-mercaptopropionic acid were dosed over one hour, while the temperature was raised from 120° C. to 140° C. Another 5 wt-% of xylene was added, and the mixture was boiled with refluxing under reduced pressure. After some hours, another 7.2 g of paratoluenesulphonic acid were added, and the mixture was boiled until an acid value below 10 was reached. Then 4,6 g of lithium carbonate and, after stirring for 30 minutes, 233 g of white spirit were added. The resin was cooled and filtered with a pressure filter using a Clarcel® filter aid, available from Elf Atochem. The resulting resin had a solids content of 85,6 wt-% and an acid value of 8,4 mg KOH/g on solids. The viscosity was measured at 23° C. and was 1.42 Pa.s.

Reaction Product B—Thiol Compound

A thiol compound was prepared by condensation of di-trimethylolpropane, 2,2-dimethylolpropionic acid, isononanoic acid, and 3-mercaptopropionic acid. The solids content of the thiol compound was 86 wt-%.

Reaction Product C—Alkyd Based High Solids Composition

A high solids alkyd was prepared of sunflower fatty acid, with an oil content of 74% and a solids content of 90 wt-% in white spirit, with a viscosity of 6.3 Pa.s at 23° C. The resulting high solids alkyd comprises unsaturated pendant groups in an amount of about 66% by weight of the condensation product.

Conventional Alkyd Based Compositions

Example 1

Comparative Examples A and B

In Example 1, a pigment-free clear coat formulation was prepared according to the formulation given in Table 1.

Comparative Examples A and B with thiol-free alkyd based compositions were formulated as given in Table 1. The solvent used was Shellsol® D40. The solids content for all three formulations was calculated to be about 60% by weight of the complete formulation.

The equivalence ratio of thiol functional groups to unsaturated CC bonds was calculated to be about 0.06 for Example 1.

In Comparative Example A Nuodex Combi APB® was used as a siccative. In Comparative Example B and in Example 1 Cur-RX® was used as a siccative.

TABLE 1

Conventional alkyds

| Composition | | Phase 1 (hours) | Phase 2 (hours) | Phase 3 (hours) |
|---|---|---|---|---|
| Example 1 | 10 pbw Reaction Product A 90 pbw Setal ® 270, 0.04 pbwV, 0.24 pbw 2,2'-bipyridyl 1.00 pbw butanone oxime | 0 | 0.5 | 1.8 |
| Comparative Example A | 100 pbw Setal ® 270, 7.5 pbw Nuodex Combi APB ®* 0.54 pbw butanone oxime | 1.3 | 1.8 | 15.5 |
| Comparative Example B | 100 pbw Setal ® 270, 0.04 pbw V, 0.24 pbw 2,2-bipyridyl, 1.00 pbw butanone oxime | 1.7 | 3.4 | 4.2 |

*resulting in 0.06 wt-% cobalt, 0.38 wt-% zirconium, 0.23 wt-% calcium

Alkyd Based High Solids Compositions

Examples 2 and 3

Comparative Examples C, D, E and F

In Examples 2 and 3 a pigment-free clear coat formulation (PVC=0%) was prepared according to the formulations given in Table 2.

In Comparative Examples C and D the same high solids alkyd was used as in Example 2. In Comparative Example C, Nuodex Combi APB® was used as a siccative. In Comparative Example D and in Example 2 the siccative was vanadium based (Cur-RX®). The solvent used was Shellsol® D40. The solids content for all three formulations was calculated to be about 81–85% by weight of the complete formulation.

In Comparative Examples E and F the same high solids alkyd was used as in Example 3. In Comparative Example E, Nuodex Combi APB® was used as a siccative. The siccative used in Comparative Example F and in Example 3 was vanadium based (Cur-RX® ). The solvent used was Shellsol® D40. The solids content for all three formulations was calculated to be about 78% by weight of the complete formulation.

The equivalence ratio of thiol functional groups to unsaturated CC bonds was calculated to be about 0.05 for Examples 2 and 3 both.

TABLE 2

High Solids alkyds.

| Composition | | Phase 1 (hours) | Phase 2 (hours) | Phase 3 (hours) |
|---|---|---|---|---|
| Example 2 | 10 pbw reaction Product A 90 pbw Setal ® 293 0.04 pbw V 0.24 pbw 2,2'-bipyridyl 1.00 pbw of butanone oxime | 0 | 0.4 | 2.9 |
| Comparative Example C | 100 pbw Setal ® 293 7.5 pbw Nuodex Combi APB ®* 0.54 pbw butanone oxime | 3.6 | 4.1 | 8.2 |
| Comparative Example D | 100 pbw Setal ® 293 0.04 pbw V 0.24 pbw 2,2'-bipyridyl 1.00 pbw of butanone oxime | 9.6 | 14.7 | 24 |
| Example 3 | 10 pbw Reaction Product A 90 pbw Synolac ® 6094 0.04 pbw V 0.24 pbw 2,2'-bipyridyl 1.00 pbw of butanone oxime | 0.4 | 0.9 | 2.0 |
| Comparative Example E | 100 pbw Synolac ® 6094 7.5 pbw Nuodex Combi APB ®* 0.54 pbw butanone oxime | 4.1 | 4.5 | 7.5 |
| Comparative Example F | 100 pbw Synolac ® 6094, 0.04 pbw V 0.24 pbw 2,2'-bipyridyl 1.00 pbw of butanone oxime | 8.7 | 12.4 | 20 |

*resulting in 0.06 pbw cobalt, 0.38 pbw zirconium, and 0.23 pbw calcium

Variation of Thiol-Content

Examples 4 and 5

Comparative Examples G AND H

In Examples 4 and 5 and Comparative Examples G and H, compositions were made comprising a pigment volume concentration (PVC) of 15% based on high solids alkyd Reaction Product C. In Examples 4 and 5 and Comparative Examples G, Cur-RX® was used as a siccative and Dri-RX® was used as an accelerator. The solvent used was white spirit. The calculated solids content was about 78–82% by weight of the complete formulation.

The equivalence ratio of thiol functional groups to unsaturated CC bonds was calculated to be about 0,04 for Example 4 and about 0,08 for Example 5.

TABLE 3

Variation of amount of thiol resin.

| Composition | | Phase 1 (hours) | Phase 2 (hours) | Phase 3 (hours) |
|---|---|---|---|---|
| Comparative Example G | 100 pbw Reaction Product C 0.03 pbwV 0.18 pbw 2,2'-bipyridyl | 9.0 | 14.0 | 20.0 |
| Example 4 | 7 pbw Reaction Product A 93 pbw Reaction Product C 0.03 pbwV 0.18 pbw 2,2'-bipyridyl | 1.5 | 2.5 | 3.8 |
| Example 5 | 14 pbw Reaction Product A 86 pbw Reaction Product C 0.03 pbwV 0.18 pbw 2,2'-bipyridyl | 0.5 | 0.5 | 1.0 |

TABLE 3-continued

Variation of amount of thiol resin.

| | Composition | Phase 1 (hours) | Phase 2 (hours) | Phase 3 (hours) |
|---|---|---|---|---|
| Comparative Example H | 100 pbw Reaction Product C<br>7.5 pbw Nuodex APB ®*<br>0.54 pbw butanone oxime | 2.6 | 3.5 | 4.7 |

*resulting in 0.06 pbw cobalt, 0.38 pbw zirconium, 0.23 pbw calcium

As can be seen from the results of these examples, increasing the amount of thiol resin leads to a decrease of the drying time. While no thiol resin produces long drying times, applying only 7 wt-% of the thiol resin results in a dramatic increase in drying speed.

Variation of Siccative Content

Examples 6, 7, and 8

Comparative Example 1

In Examples 6, 7, and 8 and Comparative Example 1, a white pigmented formulation (PVC=15%) was prepared consisting of:

7 wt-% of Reaction Product A;
93 wt-% of Reaction Product C;
2 mole equiv. of 2,2'-bipyridyl (Dri-RX®, OMG) based on V-content;
20 mole equiv. of butanone oxime based on V-content.

The amount of vanadium siccative (Cur-RX®, OMG) varied per example. The solvent used was white spirit. The solids content was calculated to be about 82–6% by weight of the complete formulation.

The equivalence ratio of thiol functional groups to unsaturated CC bonds was calculated to be about 0.04 for Examples 6, 7, and 8. The same value was calculated for Comparative Example 1.
Table 4: Variation of Amount of Siccatives.

TABLE 4

Variation of amount of siccatives.

| | Composition | Phase 1 (hours) | Phase 2 (hours) | Phase 3 (hours) |
|---|---|---|---|---|
| Comparative Example I | 0 pbw V | 24 | — | — |
| Example 6 | 0.005 pbw V | 7.0 | 11.3 | 14.8 |
| Example 7 | 0.03 pbw V | 1.5 | 2.5 | 3.8 |
| Example 8 | 0.06 pbw V | 1.0 | 1.8 | 2.8 |

The results show that increasing the amount of vanadium leads to a decrease of the drying times.

Variation of Siccatives

Examples 9–14

Comparative Examples J and K

In Examples 9–14, a white pigmented formulation (PVC=15%) was prepared of 17 pbw of Reaction Product A, 83 pbw of Reaction Product C, and 1.0 pbw of butanone oxime. In Comparative Examples J and K, the same formulation was used, except that no thiol compound was added.

In Examples 9, 10, and 11 and Comparative Example J, Cur-RX® was added up to a vanadium content of 0,05 pbw. The solids content in these Examples was calculated to be about 85–87% by weight of the formulation as a whole. The solvent used was white spirit.

In Examples 12, 13, and 14 and Comparative Example K, Mn 12 Cem-All® LC was added up to a manganese content of 0.05 pbw. The solids content in these Examples was calculated to be about 71–74% by weight of the formulation as a whole. The solvent used was Shellsol® D40.

In Examples 10, 12, 13, and 14 and in Comparative Examples J and K, Dri-RX® was added up to a 2,2'-bipyridyl content of 0.3 pbw. Further, in Examples 11 and 14 and in Comparative Examples J and K, Zr 18 Hex-Cem® was added up to a zirconium content of 0.6 pbw.

The equivalence ratio of thiol functional groups to unsaturated CC bonds was calculated to be about 0.1 for Examples 9–14.

TABLE 5

Variation of type of siccative

| | Composition | Phase 1 (hours) | Phase 2 (hours) | Phase 3 (hours) |
|---|---|---|---|---|
| Example 9 | 0.05 pbw V | 0 | 1.3 | 1.3 |
| Example 10 | 0.05 pbw V<br>0.3 pbw 2,2-bipyridyl | 0.3 | 0.6 | 0.6 |
| Example 11 | 0.05 pbw V<br>0.3 pbw 2,2-bipyridyl<br>0.6 pbw Zr | 0.3 | 0.6 | 0.6 |
| Comparative Example J | 0.05 pbw V<br>0.3 pbw 2,2-bipyridyl<br>0.6 pbw Zr | 3.5 | 6.3 | 7.6 |
| Example 12 | 0.05 pbw Mn | 0 | 8 | 13 |
| Example 13 | 0.05 pbw Mn<br>0.3 pbw 2,2-bipyridyl | 0 | 1.5 | 1.8 |
| Example 14 | 0.05 pbw Mn<br>0.3 pbw 2,2-bipyridyl<br>0.6 pbw Zr | 0 | 3.3 | 4.3 |
| Comparative Example K | 0.05 pbw Mn<br>0.3 pbw 2,2-bipyridyl<br>0.6 pbw Zr | 3.5 | 8.5 | 8.5 |

The results in Table 5 show that the addition of complexing agents like 2,2'-bipyridyl is beneficial to the drying speed.

Variation of Thiol Compound

Examples 15, 16, and 17

For Examples 15, 16, and 17, a clear coat formulation (PVC=0%) was prepared. In Example 15, 12 wt-% of Reaction Product B and 88 wt-% of Reaction Product C were used. In Example 16, the formulation comprised 5 wt-% of PT3MP and 95 wt-% of Reaction Product C. In Example 17, 7 wt-% of Reaction Product A and 93 wt-% of Reaction Product C were used.

In the three examples, Cur-RX® was added up to a vanadium content of 0,04 wt-%, calculated on the total binder, and Dri-RX® was added up to a 2,2'-bipyridyl content of 0.24 wt-%. Further, 1.0 wt-% of butanone oxime was added.

The equivalence ratio of thiol functional groups to unsaturated CC bonds was calculated to be about 0.12 for Example 15, about 0.09 for Example 16, and about 0.04 for Example 17. The solids content in Examples 15 and 16 was calculated to be 75% by weight of the formulation as a whole. In Example 17, the solids content was calculated to be 77%. The solvent used was Shellsol® D40. The results of the drying tests are shown in Table 6.

TABLE 6

Variation of type of thiol resin.

|  | Phase 1 (hours) | Phase 2 (hours) | Phase 3 (hours) |
| --- | --- | --- | --- |
| Example 15 | 1.1 | 1.4 | 3.8 |
| Example 16 | 0.8 | 1.8 | 3.4 |
| Example 17 | 0.6 | 1.4 | 3.9 |

We claim:

1. A coating composition comprising:
   a. an oxidatively drying polyunsaturated condensation product having pendant groups in an amount of more than 20% by weight of the condensation product, the pendant groups comprising unsaturated CC bonds;
   b. a polythiol having two or more SH-groups;
   c. a siccative.

2. The coating composition according to claim 1, wherein the coating composition comprises 1–30 wt-% of thiol compounds, related to the total weight of solid resin.

3. The coating composition according to claim 1, wherein the coating composition further comprises a drying accelerating complexing agent.

4. The coating composition according to claim 1 wherein the polyunsaturated condensation product is an alkyd.

5. The coating composition according to claim 1, wherein the siccative is a vanadium compound.

6. The coating composition according to claim 1, wherein the siccative is a manganese compound.

7. The coating composition according to claim 1, comprising 0–40 wt-% solvents.

8. The coating composition according to claim 1, wherein the coating composition is water-borne.

9. The coating composition according to claim 1, wherein the coating composition is in a one-pot system.

10. A coating composition comprising:
    a. an oxidatively drying polyunsaturated condensation product having pendant groups in an amount of more than 20% by weight of the condensation product, the pendant groups comprising unsaturated CC bonds;
    b. a polythiol having two or more SH-groups;
    c. a siccative;
    the equivalence ratio of thiol functional groups to unsaturated CC bonds being between 0.01 and 0.25.

11. The coating composition according to claim 1, wherein the coating composition comprises 3–20 wt-%, of thiol compounds, related to the total weight of solid resin.

12. The coating composition according to claim 1, wherein the coating composition further comprises 2,2'-bipyridyl or 1,10-phenantroline as a drying accelerating complexing agent.

13. The coating composition according to claim 1, comprising 0–30 wt-% solvents.

* * * * *